(12) United States Patent
Chen

(10) Patent No.: US 7,464,444 B2
(45) Date of Patent: Dec. 16, 2008

(54) HOSE CLAMP

(76) Inventor: Dian-Tai Chen, No. 12, Alley 63, Lane 588, Wenchang Rd., Sec. 2, Yungshun Tsun, Tatu Hsiang, Taichung County (TW)

( * ) Notice: Subject to any disclaimer, the term of this patent is extended or adjusted under 35 U.S.C. 154(b) by 71 days.

(21) Appl. No.: 11/602,215

(22) Filed: Nov. 21, 2006

(65) Prior Publication Data

US 2008/0115336 A1    May 22, 2008

(51) Int. Cl.
*F16L 33/08* (2006.01)

(52) U.S. Cl. .................................. 24/274 R

(58) Field of Classification Search ........ 24/274 R–274 WB, 279–286, 20 LS; 285/367, 410
See application file for complete search history.

(56) References Cited

U.S. PATENT DOCUMENTS

| | | | |
|---|---|---|---|
| 2,452,806 A * | 11/1948 | Tetzlaff et al. | 24/274 R |
| 3,351,989 A * | 11/1967 | Cheris et al. | 24/274 R |
| 4,257,149 A * | 3/1981 | Sydendal | 24/274 R |
| 4,473,928 A * | 10/1984 | Johnson | 24/483 |
| 5,560,087 A * | 10/1996 | Marques | 24/274 R |
| 5,956,817 A * | 9/1999 | Chen | 24/274 R |
| 6,845,549 B2 * | 1/2005 | Keller et al. | 24/274 R |
| 6,860,527 B2 * | 3/2005 | Wagner et al. | 285/420 |
| 2004/0098843 A1 * | 5/2004 | Chen | 24/274 R |

FOREIGN PATENT DOCUMENTS

ZA        2004 08620 A  *   9/2005

\* cited by examiner

*Primary Examiner*—James R Brittain
(74) *Attorney, Agent, or Firm*—Rosenberg, Klein & Lee

(57) ABSTRACT

A hose clamp includes a binding belt, which has a flat head, a protruded portion disposed adjacent to the flat head and defining a locating hole, a through hole cut through the flat head, two bottom welding flanges at two sides of the through hole, two bottom stop blocks in front of the through hole, and two bottom retaining rods behind the through hole, and a screw holder, which is attached to the top surface of the flat head to hold a screw for joining the ends of the binding belt, having two mounting plates respectively clamped on the bottom surface of the flat head and stopped between the stop blocks and the protruded portion and respectively welded to the welding flanges by spot welding, the mounting plates each having a positioning rod respectively engaged into the locating hole in the protruded portion and a retaining hole respectively forced into engagement with the retaining rods of the binding belt.

1 Claim, 2 Drawing Sheets pression# HOSE CLAMP

BACKGROUND OF THE INVENTION

1. Field of the Invention

The present invention relates to a hose clamp for fastening a hose to a pipe and more particularly, to a high-strength hose clamp, which is durable in use.

2. Description of the Related Art

FIGS. 1A~1C show a hose clamp according to the prior art. According to this design, the hose clamp comprises a binding belt 11, and a screw holder 15 holding a screw 10. The binding belt 11 has a through hole 14 in the flat head thereof, two side notches 13 at two opposite lateral sides of the flat head, and four stop flanges 12 at two ends of each of the side notches 13. The screw holder 15 has two mounting plates 16 respectively fastened to the side notches 13 and stopped between the stop flanges 12 and locating rods 17 respectively extended from the mounting plates 16 at two sides and inserted through the through hole 14 from the back side toward the front side and then respectively clamped on the front surface of the flat head of the binding belt 11 in four corners around the through hole 14. This design of hose clamp is still not satisfactory in function because of the following drawbacks:

1. When the user rotating the screw 10 to fasten up the hose clamp, the tensional force produced from the rotary motion of the screw 10 may cause the locating rods 17 to deform and to disengage from the flat head of the binding belt 11 (see the imaginary line shown in FIG. 1C).

2. When rotating the screw 10 to fasten up the hose clamp, the tensional force thus produced may cause the mounting plates 16 to deform and to disengage from the side notches 13 of the flat head of the binding belt 11.

SUMMARY OF THE INVENTION

The present invention has been accomplished under the circumstances in view. It is the main object of the present invention to provide hose clamp, which has a high strength and is durable in use.

To achieve this and other objects of the present invention, the hose clamp comprises a binding belt, the binding belt having a flat head, the flat head having a top surface and a bottom surface, a protruded portion adjacent to the flat head, a locating hole formed in the protruded portion, a through hole cut through the flat head, two welding flanges protruded from the bottom surface of the flat head at two opposite lateral sides of the through hole, two retaining rods protruded from the bottom surface of the flat head and bilaterally disposed behind the through hole, and a plurality of stop blocks protruded from the bottom surface of the flat head and bilaterally disposed in front of the through hole; and a screw holder fastened to the flat head of the binding belt to hold a screw for joining the ends of the binding belt, the screw holder comprising two mounting plates respectively clamped on the bottom surface of the flat head and stopped between the stop blocks and the protruded portion and respectively welded to the welding flanges by spot welding, the mounting plates each having a positioning rod respectively engaged into the locating hole in the protruded portion and a retaining hole respectively forced into engagement with the retaining rods of the binding belt.

DETAILED DESCRIPTION OF THE PREFERRED EMBODIMENT

Figure 1A:
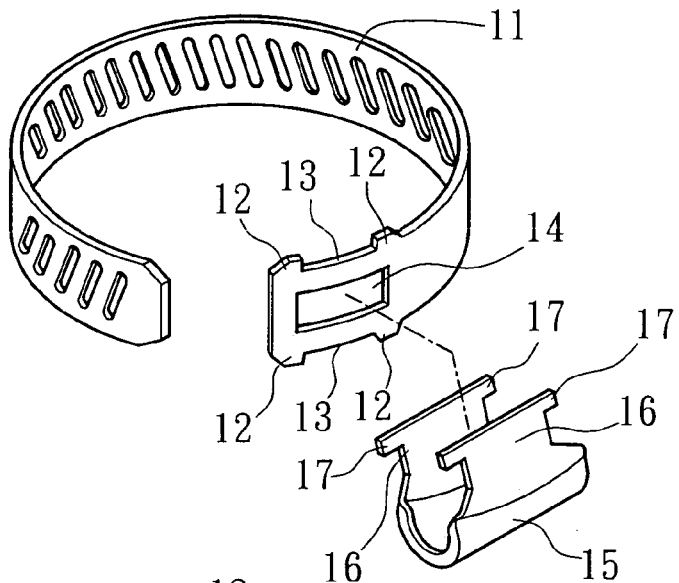
FIG. 1A is an exploded view of a hose clamp according to the prior art.
Figure 1B:
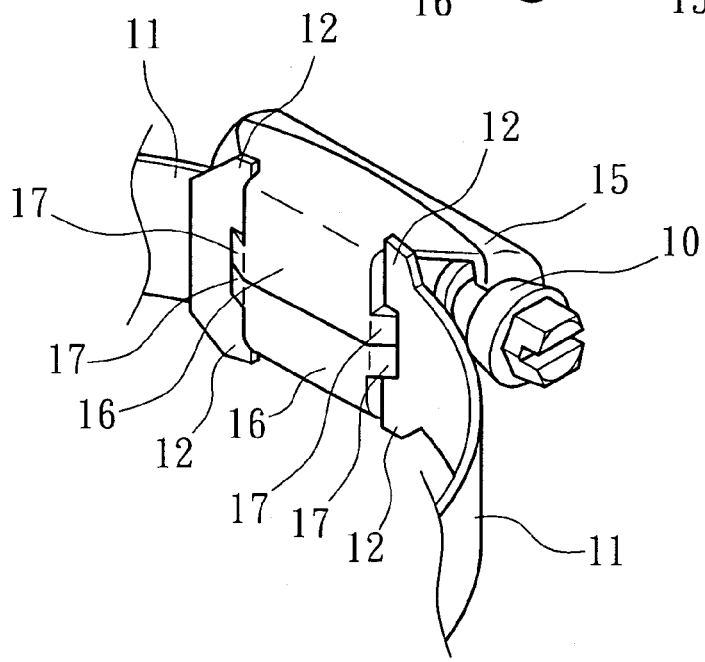
FIG. 1B is an assembly view in an enlarged scale of the hose clamp according to the prior art.
Figure 1C:
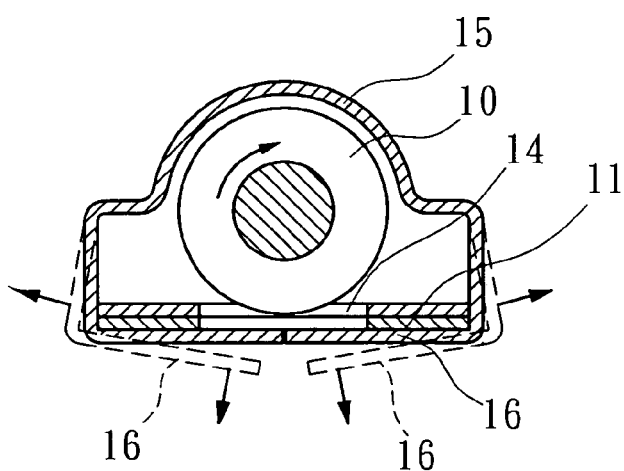
FIG. 1C is a schematic sectional view showing a breaking status of the hose clamp according to the prior art.
Figure 2:
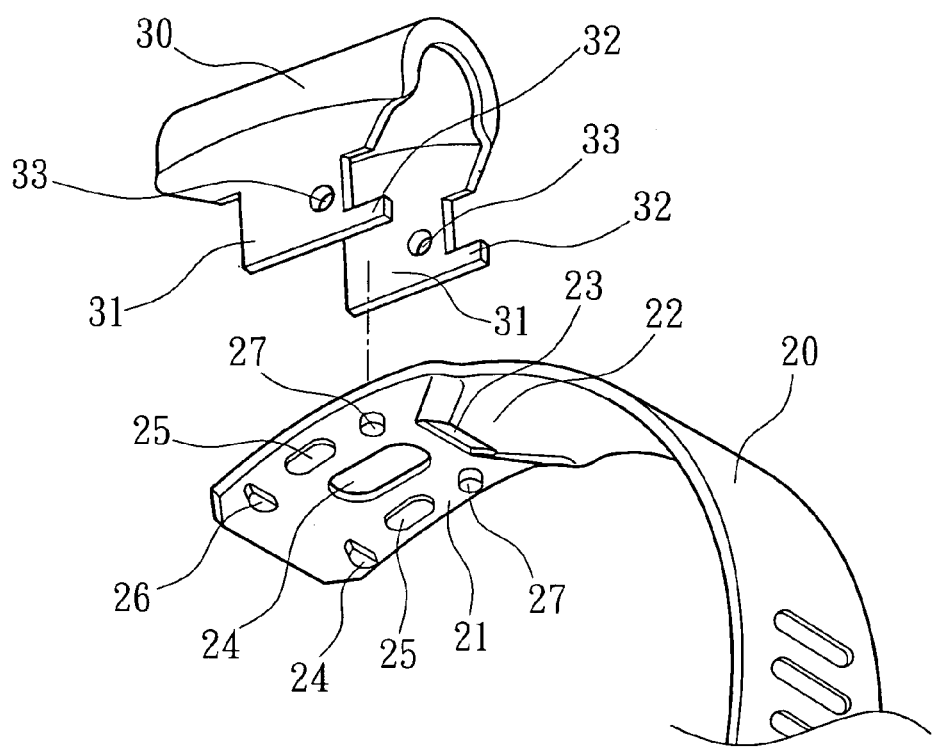
FIG. 2 is an exploded view of a hose clamp according to the present invention.
Figure 3:
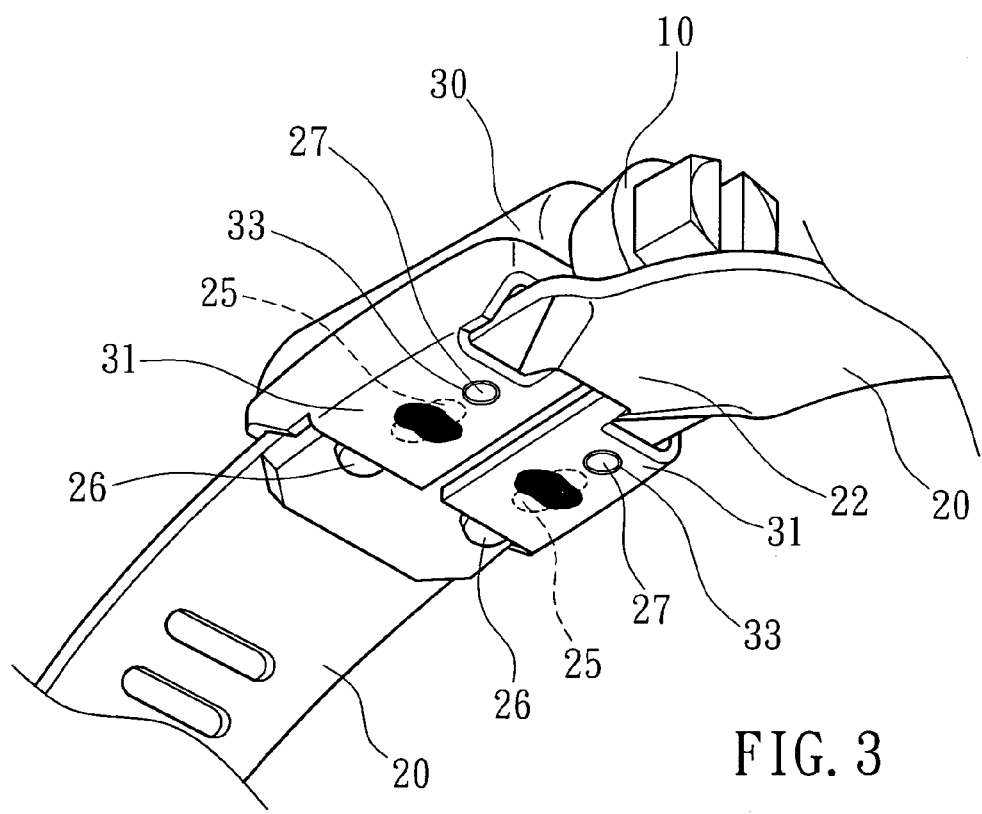
FIG. 3 is an assembly view of the hose clamp according to the present invention.

Referring to FIGS. 2 and 3, a hose clamp in accordance with one embodiment of the present invention is shown comprising a binding belt 20, and a screw holder 30 mounted with a screw 10.

The binding belt 20 has a flat head 21, a protruded portion 22 adjacent to the flat head 21, a locating hole 23 formed in the protruded portion 22, a through hole 24 cut through the top and bottom surfaces of the flat head 21, two welding flanges 25 protruded from the bottom surface of the flat head 21 at two opposite lateral sides of the through hole 24, two retaining rods 27 protruded from the bottom surface of the flat head 21 and bilaterally disposed behind the through hole 24, and two stop blocks 26 protruded from the bottom surface of the flat head 21 and bilaterally disposed in front of the through hole 24.

The screw holder 30 comprises two mounting plates 31 symmetrically disposed at two sides. Each mounting plate 31 has a positioning rod 32 extended from one side, and a retaining hole 33 disposed adjacent to the positioning rod 32.

During installation, the screw holder 30 is attached to the top surface of the flat head 21 of the binding belt 20, and then the mounting plates 31 are respectively bent inwards and clamped on the bottom surface of the flat head 21 of the binding belt 20 and stopped between the stop blocks 26 and the protruded portion 22 to force the retaining holes 33 into engagement with the respective retaining rods 27 and to engage the positioning rods 32 into the locating hole 23, and then mounting plates 31 are fixedly fastened to the welding flanges 25 by spot welding.

Because the mounting plates 31 of the screw holder 30 are stopped between the stop blocks 26 and the protruded portion 22 and because the positioning rods 32 and retaining holes 33 of the mounting plates 31 are respectively kept in engagement with the locating hole 23 and retaining rods 27 of the binding belt 20, rotating the screw 10 to fasten up the binding belt 20 does not cause the screw holder 30 to break or to disconnect from the flat head 21. Further, because the mounting plates 31 are respectively welded to the welding blocks 25, the screw holder 30 is maintained firmly secured to the flat head 21 of the binding belt 20.

As stated above, the invention provides a hose clamp that has the following features:

1. The flat head 21 of the binding belt 20 has two stop blocks 26 and a protruded portion 23 for stopping the screw holder 30 against longitudinal displacement relative to the binding belt 20.

2. The screw holder 30 has two positioning rods 32 respectively engaged into the locating hole 23 of the binding belt 20, preventing disconnection of the screw holder 30 from flat head 21 of the binding belt 20.

3. The flat head 21 of the binding belt 20 has two bottom retaining rods 27 respectively engaged into the respective retaining holes 23 of the screw holder 30, securing the screw holder 30 firmly to the flat head 21.

4. The flat head 21 of the binding belt 20 has two welding flanges 25 respectively welded to the mounting plates 31 of the screw holder 30, thereby securing the screw holder 30 firmly to the flat head 21 of the binding belt 20.

A prototype of hose clamp has been constructed with the features of FIGS. 2 and 3. The hose clamp functions smoothly to provide all the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A hose clamp comprising:

a binding belt, said binding belt having a flat head, said flat head having a top surface and a bottom surface, a protruded portion adjacent to said flat head, a locating hole formed in said protruded portion, a through hole cut through the top surface and bottom surface of said flat head, two welding flanges protruded from the bottom surface of said flat head at two opposite lateral sides of said through hole, and a plurality of retaining rods protruded from the bottom surface of said flat head and bilaterally disposed adjacent to said protruded portion; and a screw holder fastened to said flat head of said binding belt to hold a screw for joining the ends of said binding belt, said screw holder comprising two mounting plates respectively clamped on the bottom surface of said flat head and stopped against a front side of said protruded portion and respectively welded to said welding flanges by spot welding, said mounting plates each having a positioning rod respectively engaged into said locating hole in said protruded portion and a plurality of retaining holes, such that each of the plurality of said retaining holes is respectively forced into engagement with each one of the plurality of retaining rods of said binding belt, in a one to one relationship.

* * * * *